US 8,683,271 B2

(12) United States Patent
Lazzaro

(10) Patent No.: US 8,683,271 B2
(45) Date of Patent: *Mar. 25, 2014

(54) SERVICE MODELING IMPACT ANALYSIS

(71) Applicant: CA, Inc., Islandia, NY (US)

(72) Inventor: Peter Anthony Lazzaro, Great River, NY (US)

(73) Assignee: CA, Inc., Islandia, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,948

(22) Filed: Jan. 7, 2013

(65) Prior Publication Data

US 2013/0124444 A1 May 16, 2013

Related U.S. Application Data

(63) Continuation of application No. 12/620,062, filed on Nov. 17, 2009, now Pat. No. 8,418,002.

(51) Int. Cl.
*G06F 11/00* (2006.01)
(52) U.S. Cl.
USPC ............................................ 714/47.1; 714/37
(58) Field of Classification Search
USPC .................................................. 714/37, 47.1
See application file for complete search history.

(56) References Cited

U.S. PATENT DOCUMENTS

| | | | |
|---|---|---|---|
| 6,243,746 B1 * | 6/2001 | Sondur et al. ................. | 709/220 |
| 6,701,459 B2 * | 3/2004 | Ramanathan et al. .......... | 714/37 |
| 7,215,360 B2 * | 5/2007 | Gupta ........................... | 348/180 |
| 7,509,518 B2 * | 3/2009 | Bailey et al. ................. | 714/1 |
| 7,603,458 B1 * | 10/2009 | Sexton et al. ................. | 709/224 |
| 8,418,002 B2 | 4/2013 | Lazzaro | |
| 2007/0028188 A1 * | 2/2007 | Black-Ziegelbein et al. . | 715/853 |
| 2009/0157723 A1 * | 6/2009 | De Peuter et al. ............ | 707/102 |
| 2009/0319621 A1 * | 12/2009 | Barsness et al. .............. | 709/206 |
| 2011/0119530 A1 | 5/2011 | Lazzaro | |

OTHER PUBLICATIONS

U.S. Appl. No. 12/620,062, Final Office Action mailed Aug. 27, 2012, 10 pgs.
U.S. Appl. No. 12/620,062, Final Office Action mailed Nov. 16, 2011, 11 pgs.
U.S. Appl. No. 12/620,062, Non Final Office Action mailed Apr. 5, 2012, 10 pgs.
U.S. Appl. No. 12/620,062, Non Final Office Action mailed Jul. 7, 2011, 9 pgs.
U.S. Appl. No. 12/620,062, Notice of Allowance mailed Dec. 10, 2012, 7 pgs.
U.S. Appl. No. 12/620,062, Response filed Feb. 16, 2012 to Non Final Office Action mailed Jul. 7, 2011, 12 pgs.

(Continued)

*Primary Examiner* — Philip Guyton
(74) *Attorney, Agent, or Firm* — Schwegman Lundberg & Woessner, P.A.

(57) ABSTRACT

A computer system includes a plurality of computer processor dependent nodes and a plurality of computer processor antecedent nodes. Each node includes a severity value relating to an operational state of the node. A dependent node and an antecedent node pair include a significance value relating to a criticality that the antecedent node has to its paired dependent node. The antecedent node comprises a relevance value, wherein the relevance value is a function of the severity value of the antecedent node and the significance value for the antecedent node and the dependent node. The relevance value is used to determine an impact that the antecedent node has on the paired dependent node.

21 Claims, 6 Drawing Sheets

(56) References Cited

OTHER PUBLICATIONS

U.S. Appl. No. 12/620,062, Response filed Jul. 5, 2012 to Non Final Office Action mailed Apr. 5, 2012, 13 pgs.

U.S. Appl. No. 12/620,062, Response filed Oct. 5, 2011 to Non Final Office Action mailed Jul. 7, 2011, 12 pgs.

U.S. Appl. No. 12/620,062, Response filed Nov. 27, 2012 to Final Office Action mailed Aug. 27, 2012, 11 pgs.

* cited by examiner

US 8,683,271 B2

SERVICE MODELING IMPACT ANALYSIS

RELATED APPLICATION

This application is a continuation of U.S. application Ser. No. 12/620,062, filed on Nov. 17, 2009, and incorporated herein by reference in its entirety.

FIELD OF THE INVENTION

The present disclosure relates to service modeling impact analysis, and in an embodiment, but not by way of limitation, to a service modeling impact analysis that uses a severity value relating to an operational state of a node; a significance value relating to a criticality that an antecedent node has to a paired dependent node; the set of unique relationships; and the policy associated with said relationships and their ability to affect the associated business service graph through propagation models.

BACKGROUND

A core service and one or more sub-services are normally implemented in a computer system via a plurality of nodes (also referred to as configuration items). These nodes are normally processor-based, and can further include peripheral devices. Services (as compared to particular nodes or configuration items) need a more sophisticated approach in order to map the particular IT components that are responsible for a service's failure, or the service's inability to provide function to varying degrees, to the information management structure of the objects. Because of this need for a more sophisticated approach, the art is in need of a different methodology to determine the effect that particular IT components in a system have on the failure of a service of the system.

The approaches described in this background section could be pursued, but are not necessarily approaches that have previously been conceived or pursued. Therefore, unless otherwise indicated herein, the approaches described in this background section are not prior art to the claims in this application and are not admitted to be prior art by inclusion in this background section.

DETAILED DESCRIPTION

Figure 1:
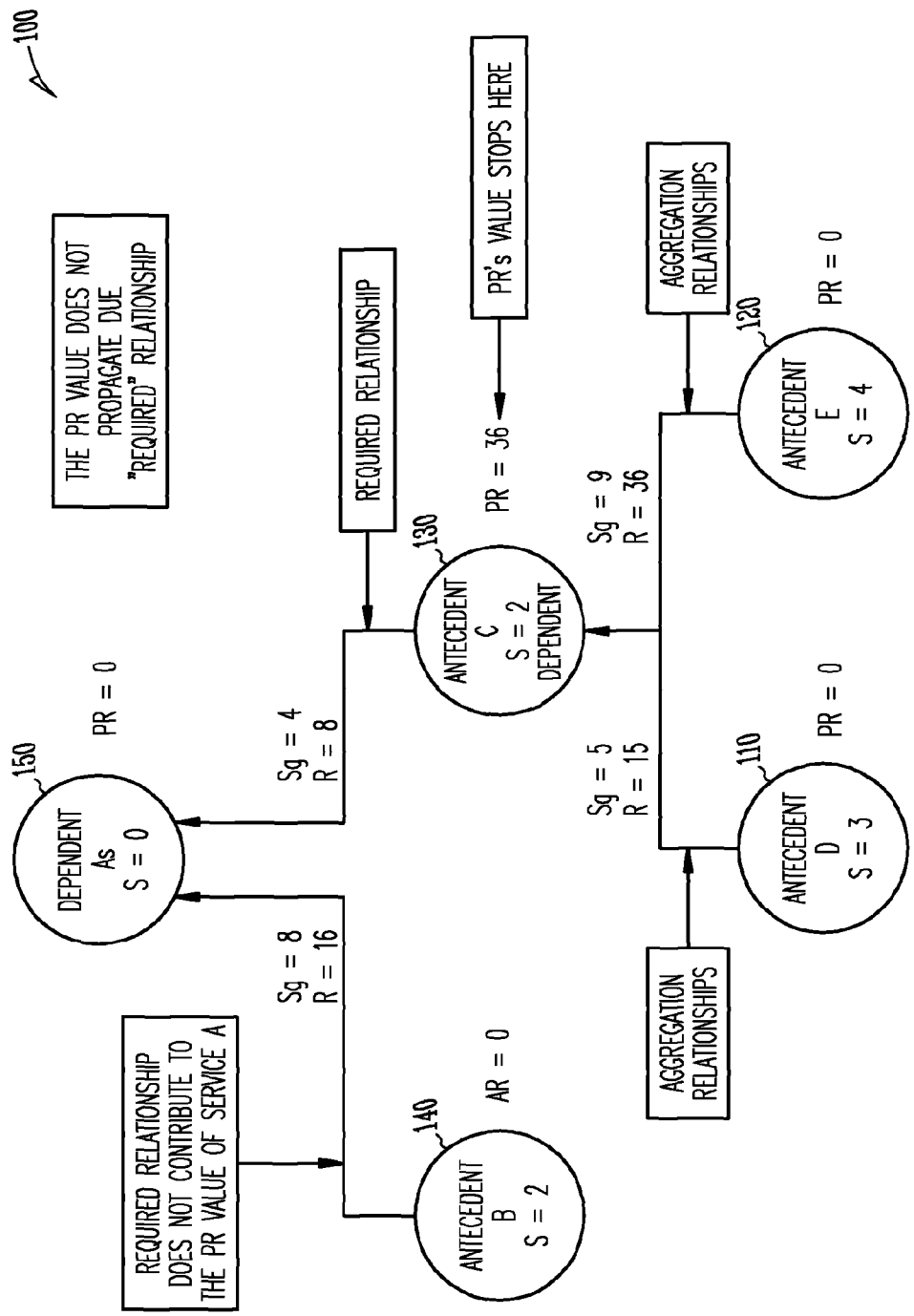
FIG. 1 is an example embodiment of a hierarchical relationship map of antecedent nodes and dependent nodes.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In all the drawings, the use of a simple hierarchy is a convenience to promote understanding of the basic concepts and functions of the invention. In a true IT environment, simple hierarchies will rarely exist. Due to a fundamental paradigm shift in the IT industry, and in particular Business Service Management, relationship graphs are needed in order to fulfill the market-based demand regarding a service's impact on the business.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.)).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

One or more embodiments provide a system and method to analyze information technology (IT) services and the services' constituent configuration items through the use of graphs constructed via an import, augmentation, or manual creation of selected elements from one or more management data repositories (MDR). Configuration items are a disparate but related set of elements that span the entire Information Technology stack and can include such things as any processor-based device or peripheral such as a server, a client machine, a hand held device, a segment of memory, and a file system, and further can include other elements such as transactions, jobs, applications, and business process, just to list a few. The embodiments further allow the graphs to be constructed in such a way that transparently enables an IT manager of the services to visualize and understand the impact that the services and associated sub-services and configuration items have on the core service. The impact in the most general sense results from one or more antecedent nodes propagating their relevance to a dependent node or configuration item. The impact can be a function of a user defined policy between a direct antecedent node and a dependent node (a "depends on" relationship), an inherent policy between the direct antecedent node and the dependent node, other antecedent nodes farther down the graph (which can include a hierarchical relationship map) that are associated with the dependent node, any propagation node from a direct antecedent node, and the severity of the dependent node itself. The embodiments further permit a consideration of the significance of the relationship between an antecedent configuration item and a dependent configuration item to determine the need to propagate an alert from an antecedent configuration item to a dependent configuration item, and to use the propagation to determine the impact on the core service.

One or more embodiments of the present disclosure, through the use of the relationship map, further narrow the scope of alerts that impact IT services. This is accomplished by preventing the propagation of all information from an antecedent node to a dependent node. That is, only those elements of the IT infrastructure that directly impact the service are considered when evaluating to what extent the service is affected. Specifically, each configuration item (or IT element) is evaluated based on certain criteria and a decision is then made to include its effects on the service or to exclude it from consideration.

In an embodiment, the IT infrastructure of a computer system, wherein the system includes a core service and associated services and sub-services, is made up of a plurality of antecedent nodes and dependent nodes (also referred to as configuration items). There can be a plurality of hierarchical levels in the system, and a dependent node that is dependent on one or more antecedent nodes can also be one of a plurality of antecedent nodes for another dependent node. For example, referring to FIG. 1, an IT infrastructure 100 includes two antecedent nodes 110 and 120. Dependent node 130 is dependent on antecedent nodes 110 and 120. Node 130 can then also be, along with node 140, an antecedent node to dependent node 150.

In constructing an IT infrastructure model like the model 100 in FIG. 1, certain rules and relationships are invoked. For example, in an embodiment, there is only one instantiation of a configuration item that is associated with any one given service. It is noted however that this rule does not preclude the configuration item from being an element in one service and an element in a sub-service where the sub-service is related to a top level service. Also, non-aggregate and non-containment relationships are only evaluated against their direct dependent node(s). This means that while their relevance values are not propagated, their associated impact may still play a role in the associated root cause of an impacted service.

In contrast to non-aggregate and non-containment relationships, a first relationship referred to as an aggregate relationship between an antecedent node and its dependent node causes the metrics of the antecedent node to be propagated to the dependent node. This propagation can include a relevance value as will be explained herein. It is noted that circular aggregate references should not be allowed (for example, in FIG. 1, the metrics of node 150 should not be permitted to propagate back to any of the nodes 110, 120, 130, or 140). Also, aggregation from an antecedent node should not be permitted to skip a dependent node (for example, in FIG. 1, metrics of node 110 should not skip over node 140 and be allowed to propagate to node 150). An aggregate relationship is unidirectional and all antecedent nodes are considered when setting a metric on a dependent node (or between the antecedent node and the dependent node). An aggregate relationship is a recursive relationship in the sense that a hierarchical tree is traversed from antecedent nodes on the bottom of the tree through dependent nodes above the antecedent nodes and certain antecedent node aspects are passed from the antecedent node to the dependent node. The passing of the antecedent node aspects can be implemented with virtually any algorithm (e.g., a selecting of maximum, minimum, average, or median values, or via a Bayesian algorithm). In an embodiment, the greatest relevance among a set of aggregate relationships propagates to the associated dependent node.

The metrics of the IT infrastructure can be represented by a significance value and a severity value. The significance value represents the relationship between two nodes. Specifically, it represents the relative importance that an antecedent node has to its dependent node. The significance value can be as simple as a value between 1 and 10 inclusive, with 10 indicating a most significant relationship between the antecedent node and the dependent node. The significance value can be assigned by an IT manager, or it can take on a default value.

The severity value relates to a configuration item itself, and not to the relationship between an antecedent node and a dependent node. In an embodiment, it can take a normalized value such as 0, 1, 2, 3, or 4. A severity value of 0 can refer to a normal condition that means that the configuration item is operational, a value of 1 can refer to a signalled condition that means that there is a nominal displacement of function of the configuration item which may or may not merit an inspection, a value of 2 can refer to a major condition that means that there is a serious issue that will typically lead to a degradation of function, a value of 3 can refer to a critical condition wherein there is a high probability of imminent failure causing a severe degradation of service, and a value of 4 can refer to a down condition wherein the configuration item is incapable of providing function or service.

A relevance value can be calculated from a significance value and a severity value. Specifically, the relevance value is the severity of an antecedent node multiplied by the significance of the relationship between the antecedent node and the dependent node. If the values of 1-10 for significance and 0-4 for severity are used as indicated above, then a relevance value of 0 would indicate the service or sub-service is operational, a value of 1-10 would indicate the service is slightly degraded, a value of 11-20 would indicate that the service is moderately degraded, a value of 21-30 would indicate that the service is severely degraded, and a value of 31-40 would indicate that the service is down and not functioning.

The calculated relevance value can be propagated from an antecedent node to its associated dependent node. That is, the relevance determination for a dependent node or configuration item is generated by one or more of its direct antecedent aggregation relationships, or antecedent aggregation relationships that have propagated up the hierarchical relationship map. Whether or not it is propagated depends on several factors or rules. For example, in an embodiment, if the relationship between an antecedent node and dependent node is an aggregate relationship, the relevance value can be propagated (as long as another antecedent node associated with that dependent node does not have its relevance propagated because for example the other antecedent node's relevance is a greater value).

In contrast to an aggregate relationship, if an antecedent node and a dependent node have what can be referred to as a required relationship (a second relationship), the metrics of the antecedent node are not propagated to the associated dependent node. Notwithstanding this required relationship model, if the antecedent is in a critical or down state, this will impact the dependent node with a severely degraded or down value. However, the state of the dependent node is still a factor (i.e., the dependent node's severity) in determining the root cause of the impacted service. Basically, in a required relationship, if the pertinent antecedent node(s) is functioning, the dependent node continues to function (and no alert is issued). The dependent node is concerned only with critical and down conditions on the antecedent node(s). Therefore, the antecedent node will propagate its relevance to the dependent node only if the antecedent node is in a critical or a down state.

The propagated relevance can be used to determine the impact on a service (Service Impact) or a configuration item (Configuration Impact) caused by a particular state of the IT infrastructure. Then, the impact on a service or a configuration item can be used to determine the effect on the associated dependent node. The service impact shows the current health of a service in general terms, and it is defined on the configuration item itself. The service impact can be defined by many algorithms. For example, it can be defined as a maximum relevance as follows:

$$I_S = [PR_S, [R_{A1} \ldots R_{An}]_{max}]_{max} \quad \text{Equation No. 1}$$

wherein $PR_S$ is the propagated relevance. It is noted that the $PR_S$ and $R_A$ may be equal to 0. So, per Equation No. 1, the service impact is determined, in this embodiment, by selecting the maximum relevance value among the antecedent nodes associated with a particular dependent node, and then selecting the maximum between that selected maximum relevance value and the propagated relevance.

The configuration item impact resides within the virtual space of the IT manager, and can be defined as:

$$I_{CI}[PR_{CI}, [R_{A1} \ldots R_{An}]_{max}]_{max} \quad \text{Equation No. 2}$$

wherein $PR_{CI}$ is the propagated relevance, and the $PR_{CI}$ and $R_A$ an may be equal to 0. So, per Equation No. 2, the configuration item impact is determined, in this embodiment, by selecting the maximum relevance value among the antecedent nodes associated with a particular dependent node, and then selecting the maximum between that selected maximum relevance value and the propagated relevance.

Then, the effect of a service impact or a configuration item impact on a dependent nodes is determined by:

$$I_S = [PR_S, [[R_{CI1}, I_{CI1}]_{max}, \ldots [R_{CIn}, I_{CIn}]_{max}]_{max}]_{max} \quad \text{Equation No. 3}$$

So, per Equation No. 3, for all antecedent nodes, a maximum is selected between each antecedent nodes' relevance and the impact of that antecedent node. Then, that maximum is compared to the propagated relevance, and the larger value is selected to indicate the impact on that dependent node. If the values as indicated above are used, a value of 0 would indicate an operational state, a value of 1-10 would indicate a slight impact, a value of 11-20 would indicate a moderate impact, a value of 21-30 would indicate a severe impact, and a value of 31-40 would indicate a down state.

The antecedent node or configuration item may or may not impact its associated dependent node or configuration item. Factors that affect whether there is an impact include user defined policies between the antecedent node and the dependent node, an inherent policy between the antecedent and the dependent node, other antecedent nodes that are associated with the dependent node, propagations that are not from a direct antecedent node (i.e., an antecedent node that is farther down the hierarchical structure), and the severity value associated with the dependent node itself.

A third relationship is the "depends on" relationship. In the depends on relationship, one or more metrics in the system is set to a user defined value. For example, if any or all antecedent configuration items in a hierarchical level have a value greater than or equal to a threshold relevance value, the impact on the direct dependent configuration item is set to a user defined value. The user is normally the system administrator. In another embodiment, the impact on the direct configuration item is set to a user defined value if a certain percentage of antecedent configuration items in a hierarchical level have a relevance greater than or equal to the threshold value. In another embodiment, if the average relevance of all the configuration items in a hierarchical level is greater than or equal to the threshold value, the impact on the direct dependent configuration item is set to a user defined value. One of skill in the art will realize that other axioms are possible for determining a "depends on" relationship. In an embodiment, the depends on relationship is only evaluated for direct antecedent node and dependent node relationships.

In an embodiment, when the "depends on" policy is triggered it applies a certain impact that was chosen by the user and that impact is applied to the dependent node or configuration item. An alert is generated when a "depends on" relationship is triggered, and this alert is tracked independently of all other alerts. In another embodiment, when the depends on policy triggers a group of antecedents, on the antecedents that are responsible for the triggering of the policy contribute their relevance values (based on the standing algorithm for propagation) to their associated dependent. Thus this relevance gets taken into account just as all other relevance values do in the process.

A fourth relationship can be referred to as a "bound" relationship. In a bound relationship, the two nodes are co-dependent. That is, there is a bi-directional association between the two nodes. Each node will propagate its relevance to its co-dependent node whenever the state of its partner node changes and vice-versa. Since both nodes are co-dependent, the significance of the triggering node (i.e., the node that has a state change) may impact its co-dependent differently due to changes in the relevance values based on the associated independent significance values at each node. When co-dependent nodes trigger concurrently, the greatest relevance (based on the propagation model) will impact all successive nodes related to the co-dependents. In contrast to the "required" relationship, the bound relationship is concerned about all conditions.

Figure 2:
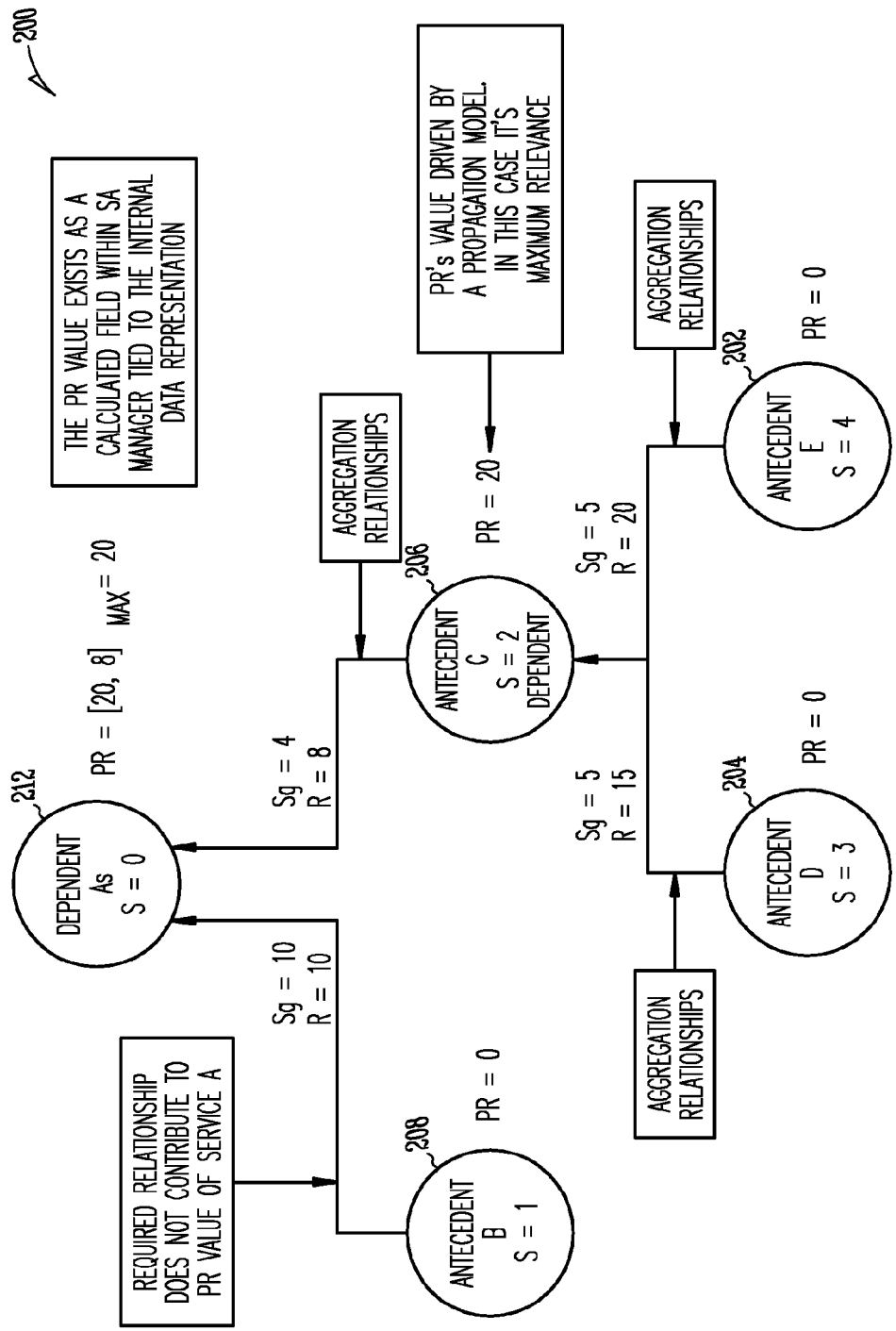
FIG. 2 is another example embodiment of a hierarchical relationship map of antecedent nodes and dependent nodes.
Figure 3:
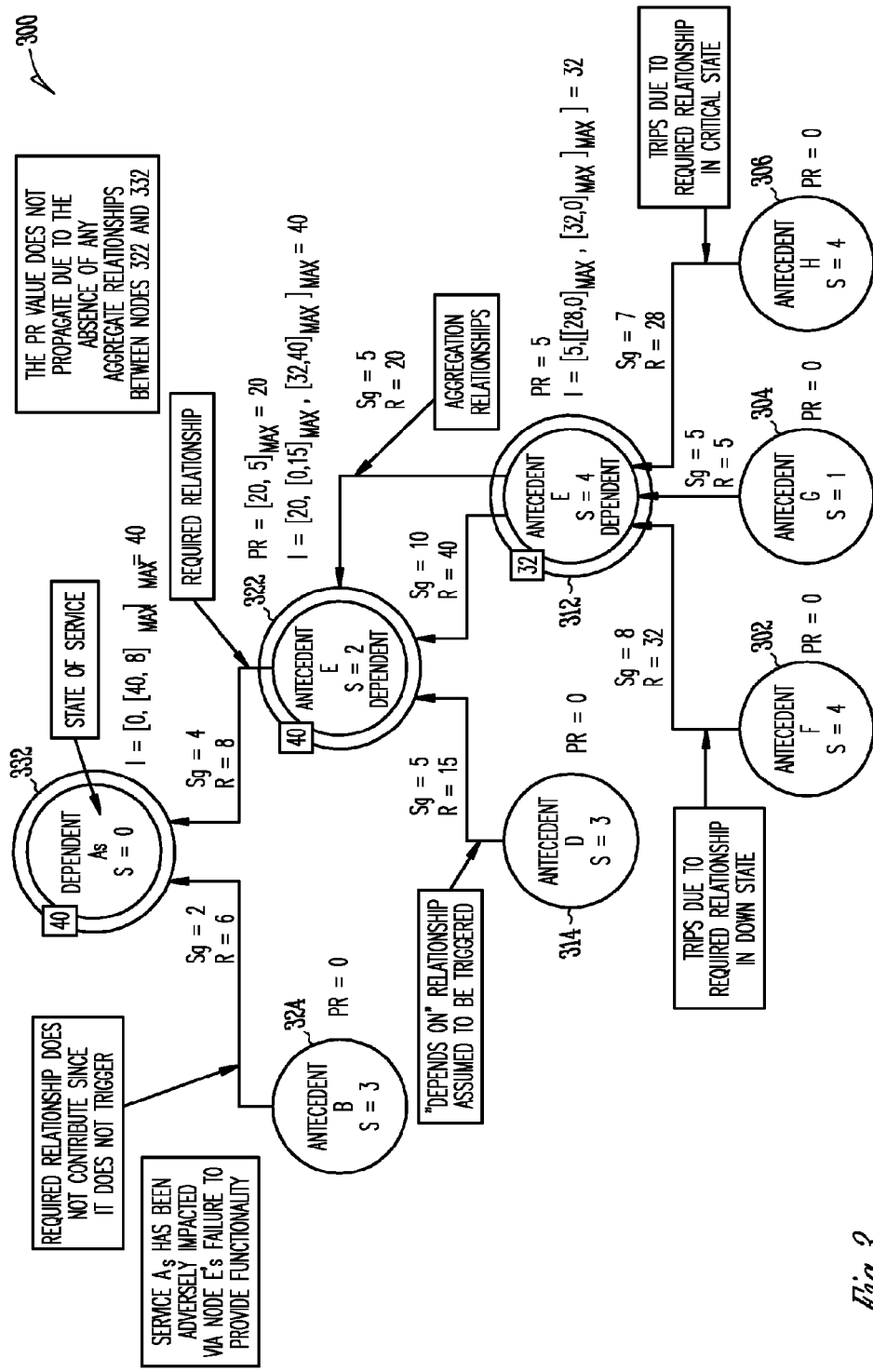
FIG. 3 is another example embodiment of a hierarchical relationship map of antecedent nodes and dependent nodes.

FIGS. 1, 2, and 3 illustrate examples of hierarchical relationship maps of antecedent nodes and dependent nodes.

FIG. 1 is an example of how the propagation of relevance values is a function of the relationships between antecedent and dependent nodes. In particular, FIG. 1 illustrates how the propagation is a function of the required relationship and the aggregate relationship. In the hierarchical relationship map 100 of FIG. 1, the antecedent nodes 110 and 120 both have an aggregation relationship with dependent node 130. Consequently, antecedent nodes 110 and 120 both have a chance that their relevance values will be propagated. In the example of FIG. 1, the relevance value for node 120 is propagated because it has a greater magnitude than the relevance value for node 110. However, as FIG. 1 further illustrates, since both antecedent nodes 130 and 140 have a required relationship with dependent node 150, no relevance value propagates to the dependent node 150, which as indicated in FIG. 1, has a propagated relevance value of 0.

FIG. 2 is another example of how relevance values propagate as a function of the relationships between antecedent and dependent nodes. The hierarchical relationship map 200 of FIG. 2 includes antecedent nodes 202 and 204, both of which have an aggregate relationship with dependent node 206. As such, both nodes 202, 204 have a chance that their relevance values will propagate to dependent node 206. In this example, the relevance value of 20 for antecedent node 202 propagates to dependent node 206 because it is the maximum relevance value between nodes 202, 204. The relationship between antecedent node 208 and dependent node 212 is a required relationship, so its relevance value will not propagate (barring that the relevance on the relationship between nodes 208 and 212 is critical or down). The relationship between antecedent node 206 and dependent node 212 is an aggregate relationship, so its relevance value can propagate, and the propagated relevance value is determined by the maximum of the previously propagated relevance value (PR=20), and the relevance value between antecedent node 206 and dependent node 212 (i.e., relevance=8). Consequently, in this case, the propagated relevance is 20 as indicated in FIG. 2.

FIG. 3 illustrates a hierarchical relationship map 300 of antecedent nodes and dependent nodes. At the bottom of FIG. 3 are nodes 302, 304, and 306, which serve as antecedent nodes to node 312. For the purposes of this example, the relationship between antecedent node 304 and dependent node 312 is an aggregate relationship, and the relationship between antecedent nodes 302, 306 and dependent node 312 is a required relationship. The relationship between antecedent nodes 314 and dependent node 322 is a "depends on" relationship. Antecedent node 312 has two relationships with dependent node 322—a required relationship and an aggregate relationship as indicated by the two arrows coupling antecedent node 312 and dependent node 322. Both antecedent nodes 322, 324 have a required relationship with the dependent node 332. The dependent node 332 can represent the overall service. In FIG. 3, nodes with concentric circles represent an associated impact on that node.

Referring still to FIG. 3, antecedent nodes 302, 306 have relevance values of 32 and 28 respectively, but since these two nodes have a required relationship with dependent node 312, their relevance values are propagated to the dependent node 312 (since both nodes meet the criteria of being in the critical/down state). Since the antecedent node 304 has an aggregate relationship with the dependent node 312, its relevance value of 5 is propagated to the dependent node 312 (as indicated by PR=5 next to node 312). The impact on dependent node 312 is determined per Equation No. 3. That is, in a nested, recursive fashion, the maximum value is determined from the relevance and impact value for each antecedent node 302, 304, and 306. This maximum value is then compared to the propagated relevance value that is propagated to the dependent node 312. This calculation is illustrated next to dependent node 312, and the impact on node 312 is determined to have a value of 32.

Proceeding up the hierarchy 300, nodes 312, 314 are now considered to be antecedent nodes to node 322. For the propagation of the relevance value to dependent node 322, antecedent node 314 has a depends on relationship with dependent node 322, and antecedent node 312 has a required relationship with dependent node 322. Therefore, the relevance value of antecedent node 314 (R=15) propagates to node 312 due to the policy threshold being exceeded in the "depends on" associativity. The relevance value for the required relationship (R=40) for antecedent node 312 also propagates to dependent node 322. The antecedent node 312 has an aggregate relationship with dependent node 322, and this relationship has a relevance value of 20. Therefore, the following values are propagated to dependent node 322—the relevance between node 312 and node 322 caused by the required relationship triggering; the impact of node 312 itself; and the relevance associated with the "depends on" relationship due to the user defined policy attributed to it.

The impact on dependent node 322 is determined once again using Equation No. 3. Therefore, per Equation No. 3, the PR (propagated relevance due to the aggregates) from nodal pairs (312, 322) and (304, 312) are examined and the propagation model is applied. In this example a maximum value model is used. Therefore, the propagated relevance at node 322 is $[20, 5]_{max}=20$. This value is inserted into Equation No. 3 as the first element in Equation No. 3 for node 322. The successive elements in Equation No. 3 for node 322 represent the relevance-impact pairs at nodes 314 and 312 respectively. Their values [0, 15] and [32, 40] represent the second and third elements of Equation No. 3. It is determined when applying the propagation model that the impact at node 322 is 40. Thus the impact at node 322 is now Down (i.e., node 322 does not have enough functionality to remain in an operational state).

Now, looking at the final service node, 332, a similar procedure is applied in determining the service's Impact based on the resources it is consuming. Node 324 has a required relationship between itself and node 332. Its relevance is calculated to be 6 (Sg(2)×Severity(3)). This does not create a relevance capable of triggering the required relationship (i.e. Critical or Down) and thus does not take part in the calculation. Node 322, however, does impact node 332. Using Equation No. 3, it is determined that the service (node 332) is Down. The relevance between nodes 322 and 332 is 8 (Sg (4)×Severity(2)). When compared to the impact at node 322 which itself is 40 and applying the propagation model (maximum value wins), it can be seen how the value was derived. This illustrates the mechanisms that are built into the design. For example, if an aggregate relationship is placed between nodes 322 and 332, then the relevance value of 20 will propagate up to the service. However, if there is a required relationship as between 322 and 332 as shown in the diagram, it may have a relevance that doesn't trigger (e.g., because it is less than critical), but the propagated relevance will still impact the service, and it may alter the root cause of the problem.

It should be noted that while the determination of the propagated relevance and the impact has in these examples been determined by determining maximum values, virtually any mathematical relationship could be used including average values, median values, minimum values, functions, etc.

Figure 4:
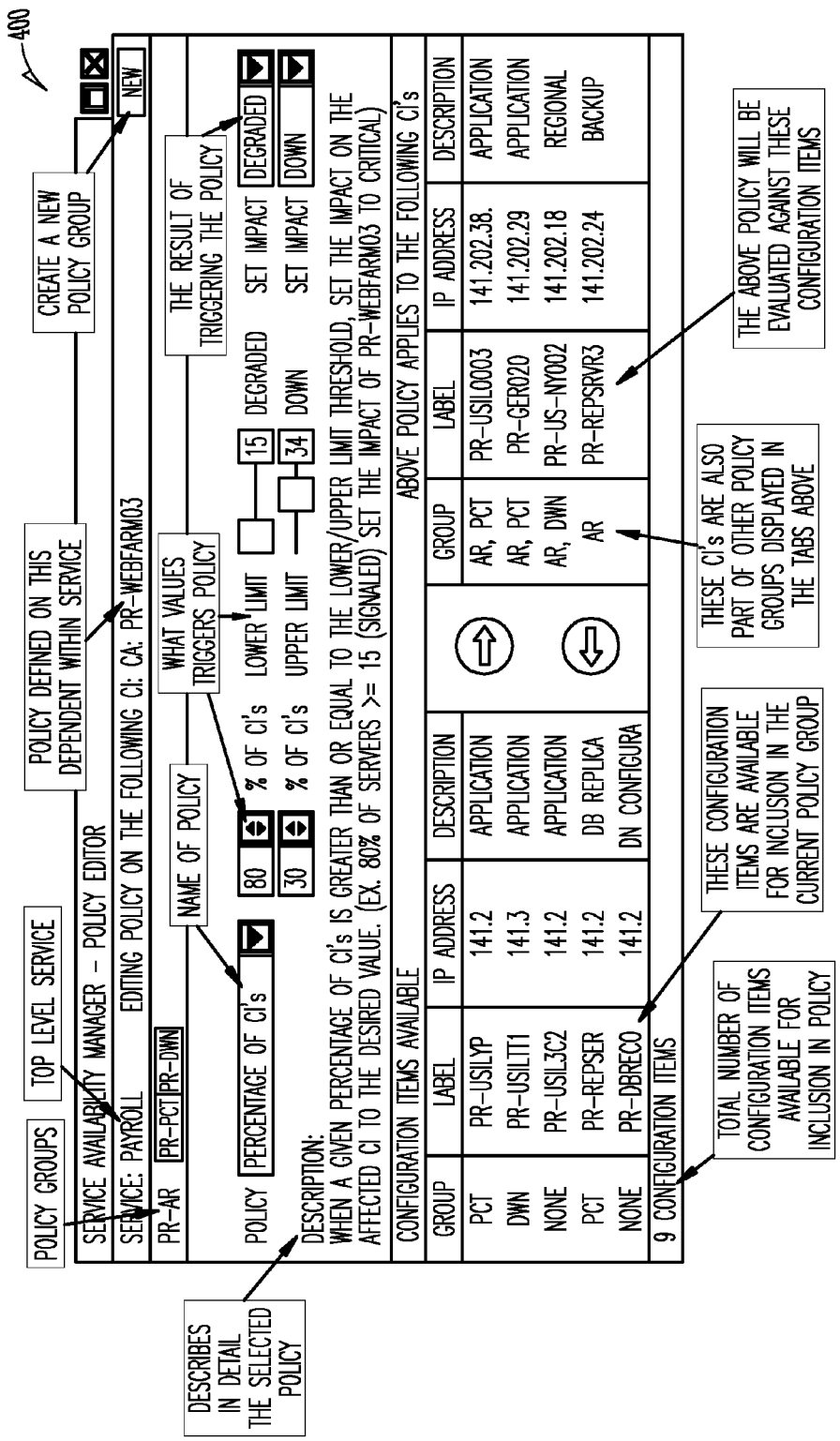
FIG. 4 is an embodiment of a user interface for use in connection with a service modeling impact analysis.

FIG. 4 is an example embodiment of a user interface 400 (or policy editor) that can be used to create policy groups and set the corresponding thresholds and impacts associated with these policy groups within a service impact analysis system. In an embodiment, an operations manager can set up the policy associated with a "Depends On" set of relationships. For each service many policies may be applied to a dependent and its associated antecedents. These antecedents may be associated with one or more policy groups. Each group having a specific policy associated with its dependent node. Each policy group may have up to two thresholds by which the policy is triggered as indicated in FIG. 4. The policy is user definable and has an associated rule to apply to the policy group. When this rule has been evaluated against the constituent CI's within the policy group it may or may not exceed the first or second level threshold criteria associated with that policy group. When this occurs, two options are available. The first is that all CIs within the policy group that are responsible for triggering the threshold criteria contribute their relevance values to the dependent node's impact. The second is that the user defines the actual impact on the dependent node directly. This amounts to calculating a relevance on the dependent node based on the user defined impact set for each threshold level. One or more policy groups may impact the dependent node concurrently in which case the propagation model applied will be the determining factor on how the dependent node is impacted. CIs, Services, and Groups may have a multitude of "Depends On" relationships associated with them.

Figure 5:
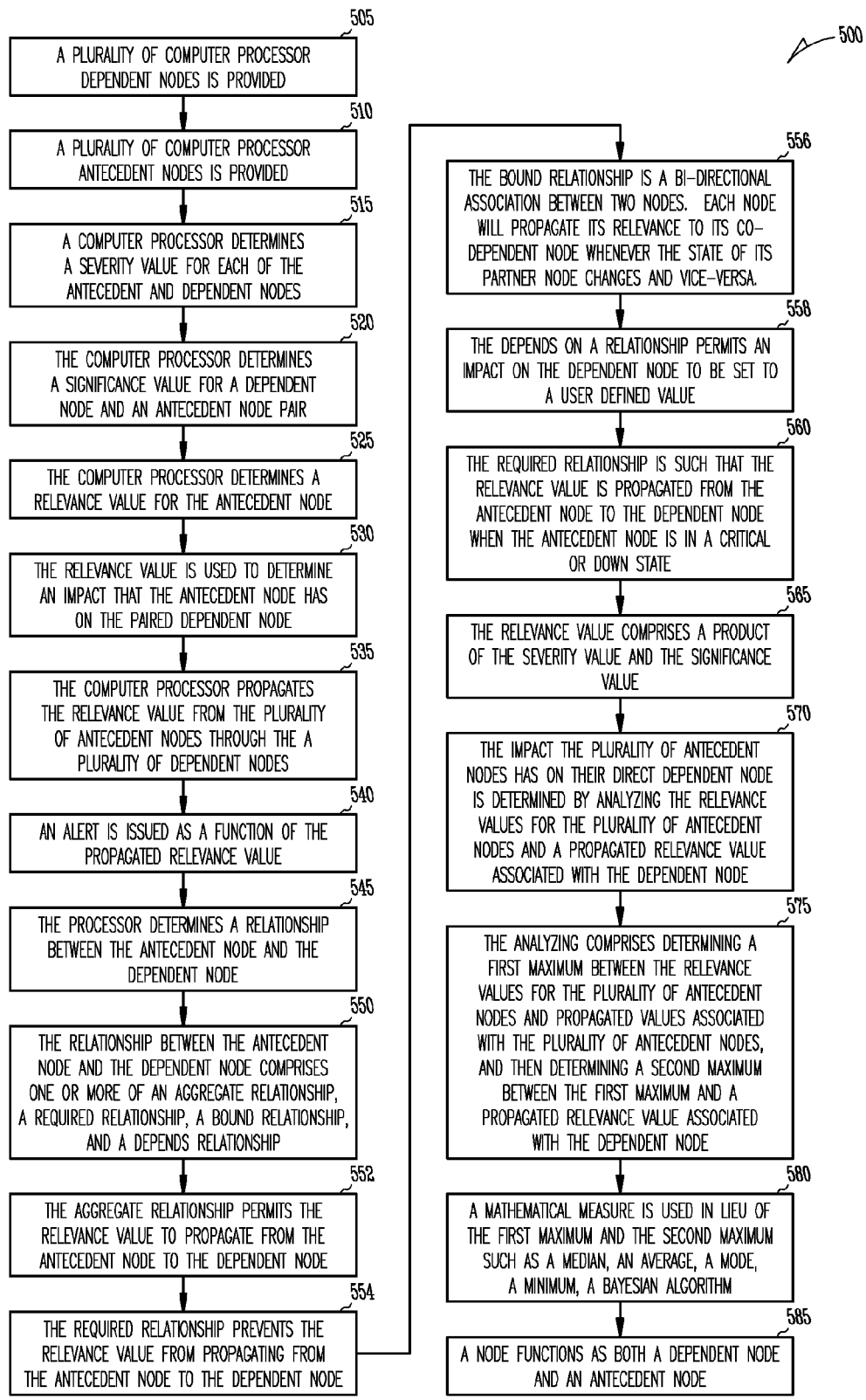
FIG. 5 is a flowchart of an example embodiment of a process for a service modeling impact analysis.

FIG. 5 is a flowchart of an example process 500 for a service modeling impact analysis. FIG. 5 includes a number of process blocks 505-585. Though arranged serially in the example of FIG. 5, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 5, at 505, a plurality of computer processor dependent nodes is provided, and at 510, a plurality of computer processor antecedent nodes is provided. At 515, a computer processor determines a severity value for each of the antecedent and dependent nodes. The severity value relates to an operational state of the node. At 520, the computer processor determines a significance value for a dependent node and an antecedent node pair. The significance value relates to a criticality that the antecedent node has to its paired dependent node. At 525, the computer processor determines a relevance value for the antecedent node. The relevance value is a function of the severity value of the antecedent node and the significance value for the antecedent node and the dependent node. At 530, the relevance value is used to determine an impact that the antecedent node has on the paired dependent node.

At 535, the computer processor propagates the relevance value from the plurality of antecedent nodes through the a plurality of dependent nodes. At 540, an alert is issued as a function of the propagated relevance value. At 545, the processor determines a relationship between the antecedent node and the dependent node. The relationship comprising a factor in determining whether the relevance value is propagated from the antecedent node to the dependent node. At 550, the relationship between the antecedent node and the dependent node comprises one or more of an aggregate relationship, a required relationship, a bound relationship, and a depends on relationship. At 552, the aggregate relationship permits the relevance value to propagate from the antecedent node to the dependent node. At 554, the required relationship prevents the relevance value from propagating from the antecedent node to the dependent node. At 556, the bound is a bi-directional association between two nodes. Each node will propagate its relevance to its co-dependent node whenever the state of its partner node changes and vice-versa. At 558, the depends on relationship permits an impact on the dependent node to be set to a user defined value.

At 560, the required relationship is such that the relevance value is propagated from the antecedent node to the dependent node when the antecedent node is in a critical or down state. At 565, the relevance value comprises a product of the severity value and the significance value. At 570, the impact the plurality of antecedent nodes has on their direct dependent node is determined by analyzing the relevance values for the plurality of antecedent nodes and a propagated relevance value associated with the dependent node and the impact at the antecedent node itself. At 575, the analyzing comprises determining a first maximum between the relevance values for the plurality of antecedent nodes and their associated impacts, if any, along with the propagated values associated with the plurality of antecedent nodes, and then determining a second maximum between the first maximum and a propagated relevance value associated with the dependent node. At 580, a mathematical measure is used in lieu of the first maximum and the second maximum such as a median, an average, a mode, a minimum, a Bayesian algorithm. At 585, a node functions as both a dependent node and an antecedent node.

Figure 6:
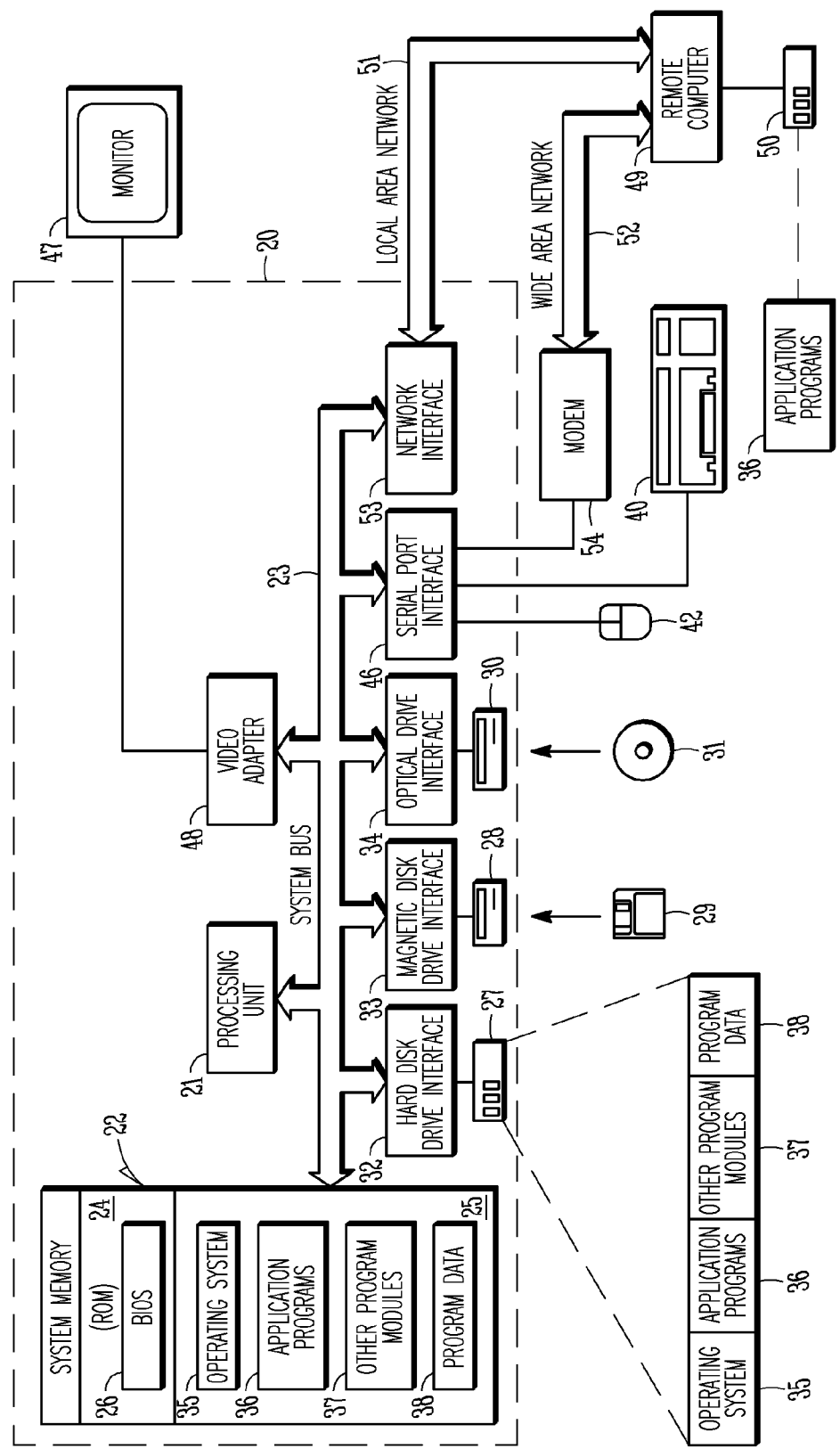
FIG. 6 is an example embodiment of a computer system upon which one or more embodiments of the present disclosure can operate.

FIG. 6 is an overview diagram of a hardware and operating environment in conjunction with which embodiments of the invention may be practiced. The description of FIG. 6 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for implementing a service impact analysis system has been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

What is claimed is:

1. A computer system comprising:
a plurality of computer processor dependent nodes;
a plurality of computer processor antecedent nodes; and
relationships between the antecedent nodes and the dependent nodes;
wherein the relationships comprise an aggregate relationship, a required relationship, a bound relationship, and a depends on relationship;
wherein each node comprises a severity value relating to an operational state of the node;
wherein a dependent node and an antecedent node pair comprise a significance value relating to a criticality that the antecedent node has to its paired dependent node;
wherein the antecedent node comprises a relevance value, wherein the relevance value is a product of the severity value of the antecedent node multiplied by the significance value for the antecedent node and the dependent node; and
wherein the relevance value is used to determine an impact that the antecedent node has on the paired dependent node.

2. The computer system of claim 1, wherein the relevance value is propagated from the plurality of antecedent nodes through the plurality of dependent nodes.

3. The computer system of claim 2, wherein an alert is issued as a function of the propagated relevance value.

4. The computer system of claim 1, the relationships comprising a factor in determining whether the relevance value is propagated from the antecedent node to the dependent node.

5. The computer system of claim 1,
wherein the aggregate relationship permits the relevance value to propagate from the antecedent node to the dependent node;
wherein the required relationship prevents the relevance value from propagating from the antecedent node to the dependent node;
wherein the bound relationship permits each of the antecedent node and the dependent node to propagate its relevance value to its associated co-dependent node in a bi-directional manner whenever the state of its co-dependent node changes; and
wherein the depends on relationship acts on a group of antecedent nodes based on predefined policy and user defined policy groups to permit an impact on the dependent node to be set to a user defined value.

6. The computer system of claim 5, wherein the required relationship is such that the relevance value is propagated from the antecedent node to the dependent node when the antecedent node is in a critical or down state.

7. The computer system of claim 1, wherein a node functions as both a dependent node and an antecedent node.

8. A process comprising:
providing a plurality of computer processor dependent nodes;
providing a plurality of computer processor antecedent nodes;
establishing relationships between the antecedent nodes and the dependent nodes, wherein the relationships comprise an aggregate relationship, a required relationship, a bound relationship, and a depends on relationship;
using a computer processor to determine a severity value for each of the antecedent and dependent nodes, the severity value relating to an operational state of the node;
using the computer processor to determine a significance value for a dependent node and an antecedent node pair, the significance value relating to a criticality that the antecedent node has to its paired dependent node;
using the computer processor to determine a relevance value for the antecedent node, wherein the relevance value is a product of the severity value of the antecedent node multiplied by the significance value for the antecedent node and the dependent node; and
using the relevance value to determine an impact that the antecedent node has on the paired dependent node.

9. The process of claim 8, comprising using the computer processor to propagate the relevance value from the plurality of antecedent nodes through the plurality of dependent nodes.

10. The process of claim 8, comprising issuing an alert as a function of the propagated relevance value.

11. The process of claim 8, the relationships comprising a factor in determining whether the relevance value is propagated from the antecedent node to the dependent node.

12. The process of claim 8,
wherein the aggregate relationship permits the relevance value to propagate from the antecedent node to the dependent node;
wherein the required relationship prevents the relevance value from propagating from the antecedent node to the dependent node;
wherein the bound relationship permits each of the antecedent node and the dependent node to propagate its relevance value to its associated co-dependent node whenever the state of its co-dependent node changes; and
wherein the depends on relationship acts on a group of antecedent nodes based on predefined policy and user defined policy groups to permit an impact on the dependent node to be set to a user defined value.

13. The process of claim 8, wherein the required relationship is such that the relevance value is propagated from the antecedent node to the dependent node when the antecedent node is in a critical or down state.

14. The process of claim 8, wherein a node functions as both a dependent node and an antecedent node.

15. A tangible non-transitory computer readable medium comprising instructions that when executed by a computer processor executes a process comprising:
providing a plurality of computer processor dependent nodes; and
providing a plurality of computer processor antecedent nodes;
using a computer processor to determine a severity value for each of the antecedent and dependent nodes, the severity value relating to an operational state of the node;
using the computer processor to determine a significance value for a dependent node and an antecedent node pair, the significance value relating to a criticality that the antecedent node has to its paired dependent node;
using the computer processor to determine a relevance value for the antecedent node, wherein the relevance value is a product of the severity value of the antecedent node multiplied by the significance value for the antecedent node and the dependent node; and
using the relevance value to determine an impact that the antecedent node has on the paired dependent node.

16. The tangible non-transitory computer readable medium of claim 15, comprising instructions for propagating the relevance value from the plurality of antecedent nodes through the plurality of dependent nodes.

17. The tangible non-transitory computer readable medium of claim 15, comprising instructions for issuing an alert as a function of the propagated relevance value.

18. The tangible non-transitory computer readable medium of claim 15, wherein the relationships comprise a factor in determining whether the relevance value is propagated from the antecedent node to the dependent node.

19. The tangible non-transitory computer readable medium of claim 15,
- wherein the aggregate relationship permits the relevance value to propagate from the antecedent node to the dependent node;
- wherein the required relationship prevents the relevance value from propagating from the antecedent node to the dependent node;
- wherein the bound relationship permits each of the antecedent node and the dependent node to propagate its relevance value to its associated co-dependent node whenever the state of its co-dependent node changes; and
- wherein the depends on relationship acts on a group of antecedent nodes based on predefined policy and user defined policy groups to permit an impact on the dependent node to be set to a user defined value.

20. The tangible non-transitory computer readable medium of claim 15, wherein the required relationship is such that the relevance value is propagated from the antecedent node to the dependent node when the antecedent node is in a critical or down state.

21. The tangible non-transitory computer readable medium of claim 15, wherein a node functions as both a dependent node and an antecedent node.

* * * * *